United States Patent [19]

Gross

[11] 3,975,185

[45] Aug. 17, 1976

[54] PARTICULATE EMISSIONS REDUCTION IN SINTERING OPERATIONS

[75] Inventor: Anthony E. Gross, Darien, Ill.

[73] Assignee: Nalco Chemical Company, Oak Brook, Ill.

[22] Filed: Apr. 3, 1975

[21] Appl. No.: 564,590

[52] U.S. Cl. ............................................. 75/5; 75/3
[51] Int. Cl.² .......................................... C22B 1/16
[58] Field of Search ...................................... 75/3–5

[56] References Cited

UNITED STATES PATENTS 3,309,196    3/1967    Kaneko .................................. 75/3

Primary Examiner—Peter D. Rosenberg
Attorney, Agent, or Firm—John G. Premo; Robert A. Miller; Barry W. Sufrin

[57] ABSTRACT

Particulate matter common to sintering operations can be substantially reduced by the addition to the sinter mix prior to fusion of a soluble lignosulfonate.

3 Claims, No Drawings

PARTICULATE EMISSIONS REDUCTION IN SINTERING OPERATIONS

INTRODUCTION

In sintering, a shallow bed of fine particles is agglomerated by heat exchange and partial fusion of the quiescent mass. Heat is generated by combustion of a solid fuel admixed with the bed of iron bearing fines being agglomerated. The combustion is initiated by igniting the fuel exposed at the surface of the bed, after which a narrow, high temperature zone is caused to move through the bed by an induced draft, usually applied at the bottom of the bed. Within this narrow zone, the surfaces of adjacent particles reach fusion temperature, and gangue constituents form a semi-liquid slag. The bonding is effected by a combination of fusion, grain growth and slag liquidation. The generation of volatiles from the fuel and fluxstone creates a frothy condition and the incoming air quenches and solidifies the rear edge of the advancing fusion zone. The product consists of a cellular mass of ore bonded in a slag matrix.

In the ferrous industry, the essential materials for sintering consist of a mixture of iron-bearing fines and a solid, particulated fuel. The iron-bearing constituents are principally iron ore fines, recycled sinter fines, and flue dust, but may also include mill scale, open hearth precipitator dust, dust from basic oxygen steel production (BOP) and similar iron-bearing materials. Coke breeze is the most common solid fuel, but other carbonaceous materials can be used. When sintering a high sulfur material, such as a pyrite, the oxidation of the sulfur may satisfy completely the fuel requirements. It has also become common practice to incorporate limestone fines into the sinter mix, and this material may now be considered as a usual constituent in a typical sinter mix. This composite of fine material is well mixed and placed on the sinter strand in a shallow bed, seldom less than 6 inches or more than 20 inches in depth. Upon ignition, within a furnace which straddles the bed, the surface of the bed is heated to about 2300° to 2500°F, combustion of the fuel is initiated, and the fine particles at the surface are fused together. As air is drawn through the bed, the high temperature zone of combustion and fusion moves downwardly through the bed and produces a bonded, cellular structure.

During the process, the induced air is preheated by the hot sinter overlying the combustion and fusion zone, and the sensible heat contained in the combustion products and in the excess air is transferred to the bed below the fusion zone.

The detailed design and physical placement of sintering equipment and the flow pattern of materials may differ considerably among various plants. The choice of equipment is generally based on desired capacity, space availability, capital costs, the materials to be handled, and prevailing technology. Each plant can, however, be subdivided into three distinct phases of operation. These are (1) raw materials processing, (2) sinter production, and (3) product processing.

In the raw materials processing operation, the inbound iron-bearing fines are first screened, or crushed and screened, at the maximum size desired for the furnace coarse ore, generally 2 to 3 inches. The undersize ore is then rescreened at three-eighths to one-half inch, the oversize sent directly to the furnace as coarse ore, and the undersize conveyed to storage bins. A separate raw materials system handles the balance of the materials, such as flue dust, limestone, coke breeze, mill scale, etc. Except for the coke breeze, these materials are sufficiently fine for sintering and are conveyed directly to the storage bins. The coke breeze is ground prior to storage. From the raw materials storage bins, the desired materials are fed at controlled and specified rates onto a common collector belt, and thence to a mill or other mixing device such as a balling drum or disc. These devices used singularly or in combination promote both mixing and balling. Moisture for proper conditioning of the mix is added during the mixing and conditioning. The mixed and micropelletized feed is transferred to the sinter strand.

The production of the sinter per se occurs entirely on the sinter strand. Prior to feeding the raw mix, a grate layer of cold intermediate size sinter, usually three-fourths inch by one-fourth inch, is fed onto the machine usually to a depth of 1 to 2 inches. This is done to reduce the temperature to which the grate bars are exposed; lower temperatures extend grate bar life. This layer also suffices to reduce the amount of fine material reaching and passing through the grate bars. The raw mix is fed directly onto the grate layer to a predetermined bed depth usually 12 - 16 inches, ignited by a furnace fired with a liquid or gaseous fuel, and the process initiated. The speed of the machine (sinter strand) is regulated such that the high temperature zone of fusion reaches the grate layer as the material reaches the discharge end of the machine.

After ignition, suction fans pull air through the sinter bed into windboxes located between the upper and lower reaches of the sinter strand and then into one or more collection mains essentially causing the forced air ignition and fusion of the sinter mix. Dust cleaning of the exhaust gas is done in cyclone separators or precipitators. In some instances, a combination of these two types of equipment is used and placed between the collector mains and the fans.

Product processing begins at the discharge from the strand where the porous coherent lumps pass through a breaker. The large cake is reduced to a maximum size of 8 to 12 inches to facilitate cooling. The fines generated from this crushing operation are removed by a screen and recycled to the raw mix feed. The oversize is conveyed to sinter cooler. These are usually devices for passing air through the sinter, all of which function to reduce the temperature of the sinter such that it may be subsequently handled without damage to the conveying equipment. From the cooler, the sinter is cold screened, usually into three size consists. The smallest size consist, usually minus one-fourth inch, is recycled as cold return fines. An intermediate size, usually three-fourths inch by one-fourth inch, is either recycled as grate layer or sent to product storage depending on the needs for grate layer material. The coarsest size is sent directly to product storage.

A serious problem which has long been associated with sinter production has been the fact that while dust cleaning of exhaust gas is usually done in vacuum separators, cyclones or electrostatic precipitators in some instances these means are unable to remove all of the fine particulate matter from the tremendous volume of gases exhausted during the ignition, blowing and cooling stages with the result being that very serious air pollution problems have become associated with the process. It would, therefore, be an advantage to the art if a method could be found for the prevention of dusting and fines during the sintering operation. This method would provide an economical method of substantially reducing particulate emissions from sintering operations and would help to speed up sintering operations due to the fact that less dust collected by conventional techniques would have to be fed back and thus recycled.

I have now found that by adding to the iron bearing fines prior to ignition an aqueous solution of a lignosulfonate these particulate emissions can be greatly eliminated.

OBJECTS

It is, therefore, an object of my invention to provide to the art a method for the reduction of particulate matter from sintering processes.

A further object of my invention is to provide to the art a method for the reduction of particulate emissions from sintering plants which comprises spraying onto the iron bearing fines and solid fuel an aqueous solution of a lignosulfonate.

A still further object of my invention is to substantially reduce particulate emissions from cooling and heating operations in sintering plants by spraying onto the iron-bearing fines prior to ignition an aqueous solution of a water soluble lignosulfonate.

Other objects will appear hereinafter.

THE INVENTION

Dust problems from sintering plants are well known and with recent improved air quality standards will have to be very severely limited. To this point in time no known feasible technology has succeeded in eliminating the particulate emissions from this process and due to the increased importance of sinter and the recovery of iron fines for reuse, a method that would substantially reduce particulate emissions would be of great help. I have found that by spraying onto the iron bearing fines and other material an aqueous solution of a water soluble lignosulfonate prior to ignition substantial reductions in particulate matter emissions are realized using conventional sintering plant technology.

The lignosulfonates which I prefer to use in the method of my invention are those obtained by the sulfite pulping process in paper making. Additionally, these compounds can be prepared from bark and may contain sulfonated bark phenolic acids as well as lignosulfonates.

The woods used in the sulfate process of pulp making are generally mixtures of coniferous and deciduous of considerable variation. The composition depends on location, pulp wood costs, pulp specifications and other conditions. The pulp is generally made by working wood chips under pressure in a solution of sulfurous acid and calcium, magnesium, sodium, or ammonium bisulfite with calcium bisulfite being the most widely used. The lignosulfates are obtained in this process after the concentration of the spent liquor are of complex organic structures and have generally not been completely defined. A more detailed description of the structure of lignosulfonates is found in the Encyclopedia of KirkOthmer Chemical Technology, Interscience Publishers, New York, 1967, Volume 12, pages 361–381.

The molecular weight of the lignosulfonates which I prefer to use in my invention is typically in excess of 250. However, the molecular weight range in a normal spent liquor may extend from this figure to 100,000 and higher. The average molecular weight of the lignosulfonates which I prefer to use in my invention can vary from about 1,000 to about 10,000 to about 30,000.

The lignosulfonates which I prefer to use must be soluble in water. Additionally, the lignosulfonates may exist in the free sulfonic acid derivative form or may be anyone of a number of water soluble salts such as those of sodium, potassium, calcium, magnesium, or ammonia. It is only important for my invention that the lignosulfonates be water soluble.

We do not completely understand how the interaction of the soluble lignosulfonates works on sinter, however, we believe that the lignosulfonate acts as a binding or agglomerating agent and attaches the fines to one another and/or to larger particles. In the agglomerated state, the fines are not drawn out of the furnace by the high air velocity, and discharge to the atmosphere is prevented. Also, by agglomerating the fines into larger particles the fines are prevented from filling voids in the bed and thus greater porosity is obtained which allows faster movement of the sinter bed with less wind box vacuum buildup. The water soluble lignosulfonates which I prefer to use in this invention are generally burnt off the sinter by the high heat of ignition of combustion. I do not know how the lignosulfonate acts as a binder in the later stages of the sintering process since it should be removed by burning, yet, surprising results are obtained by using my compounds.

In the use of my water soluble lignosulfonates I prefer to spray these components onto the iron-bearing fines or sinter mix as a very dilute solution which may vary between 0.01% up to about 10% by weight. We also prefer to spray the material on using a pressurized system which can typically give from 10 to 100 pounds per square inch of pressure so that I may achieve penetration of the lignosulfonate into the fines which are to be fused. In the spraying of the water soluble lignosulfonates onto the iron-bearing fines it should be noted that the amount of moisture present should be controlled, with the moisture level present being distributed through routine experimentation as to the quality of sinter produced with varying moisture content. Thus, a more or less concentrated solution of my lignosulfonates can be used depending on the moisture content of the iron-bearing fines as they enter the sintering process.

In the application of my lignosulfonate I prefer to add at least 0.0025 pounds of the lignosulfonate per ton of iron bearing fines and other materials used to make up the mix of the material to be sintered. Preferably we prefer to add from 0.025 to 5 pounds of the lignosulfonate per ton. Most preferably we prefer to add from 0.01–1 pound of the lignosulfonate per ton of mix.

We have found that concentrations below this level do not provide enough binding ability although some activity in reducing particulates will be seen. As much lignosulfonate as necessary can be added to the material before it is ignited since another of the advantages of our material is that it will burn in the sinter furnace and will not provide substantial residue to the sinter.

We have also found in the course of our invention that in order to increase the penetration of the lignosulfonate into the sinter mix, it may be advantageous to admix with the lignosulfonate a quantity of a water soluble surfactant. These surfactants when employed in our invention are added at low levels to the concentrated lignosulfonate solution prior to spraying. Often, from 0.01–10% by weight of these surfactants may be added to the concentrated solution of the lignosulfonate prior to dilution and spraying. Preferably, from 0.1–3% by weight surfactant is added to the concentrated solution of the water soluble lignosulfonate prior to dilution and spraying. The surfactants which I prefer to use are of well known types and will be familiar to those of ordinary skill in the art. Examples of suitable surfactants include polyethylene glycols of molecular weight 200–1000 which have been esterified with fatty acids of 12–20 carbon atoms, such as polyethylene glycol of 400 molecular weight esterified with two moles of oleic acid. While the surfactants that we prefer to use are of the nonionic class, other surfactants, both cationic and anionic may perform satisfactory providing that they are water soluble, and remain soluble in the lignosulfonate solutions.

When using the surfactants, they should be added in a quantity sufficient to increase the penetration and wetting of the lignosulfonate into the sinter mix.

In order to better illustrate our invention, the following example is presented.

EXAMPLE

In this example, an aqueous solution of a sodium lignosulfonate was sprayed onto the sinter mix as it was being conveyed from the storage bins to the sinter furnace. The sinter mix employed in this example consists of the following:

| | |
|---|---|
| 1) Red Ore Fines | 36% |
| 2) Canadian Ore Fines | 14% |
| 3) Coke Breeze | 8% |
| 4) FLux Fines | 14% |
| 5) BOP Fines (Basic Oxygen Process) | 7% |
| 6) Baghouse Fines (Dust recovered from sintering operations) | 4% |
| 7) Recycled Sinter Fines | 5% |
| 8) Recycled Sinter (Hearth Layer) | 10% |

The function of the various components in the sinter mix were as follows:
1. Source of Iron
    a. Red Ore Fines
    b. Canadian Ore Fines
    c. BOP Fines
    d. Baghouse Fines
    e. Recycled Sinter Fines
2. Remove Impurities From the Iron and Transfer Them to Slag (Fluxing)
    a. Flux Fines
3. Provide Fuel For Sintering Mix After Initial Ignition
    a. Coke Breeze
    b. BOP Fines (Sometimes contain carbon)

In order to get good distribution throughout the sinter mix, the solution was simultaneously sprayed at two points. At one point a manifold with three spray nozzles was directed to the burden or sinter mix as it fell from one conveyor belt to another. As the burden was falling through the air it was diffused, which enables good penetration of the sprays. At the second point, a manifold with two spray nozzles was directed at the sinter mix on a conveyor belt after the mix had already been sprayed at the first point. Following this second application, the burden was transferred from one conveyor belt to another several times to give further mixing. The solution to be sprayed was obtained from the in-line dilution of a concentrated solution of sodium lignosulfonate having approximately 50% solids. The flow of dilution water was three gallons per minute and that of the concentrated solution was 0.17 gallons per minute. After dilution, the flow was sprayed and a portion sent to each of the two manifolds such that each manifold sprayed the same amount of solution. Water added previously to this point was reduced as to give the normal plant moisture level in the sinter mix. The concentrated sodium lignosulfonate solution contained approximately 50% sodium lignosulfonate and a small amount of a nonionic surfactant for proper wetting. This solution was added at a level of 0.015% to the sinter mix. When the sodium lignosulfonate solution was sprayed in the above manner several improvements in plant operations were noticed:

A. A visual inspection of the stack showed a large reduction in the amount of "red dust" going out of the stack and into the atmosphere.
B. Bolometer readings taken inside the stack were lower, indicating less particulate matter going through the stack.
C. Less dust was collected by the cyclones which were the normal dust collection means employed by this plant to collect sinter dust prior to the stack, indicating less dust being admitted from the sinter operation.
D. Wind box vacuum was less and more constant then in runs without our chemical additive indicating greater bed porosity and less blinding of the bed.
E. Better ignition and flame penetration was noted on the bed with less surface flaring indicating greater porosity.
F. Better and more even burning rates were achieved with our chemical treatment.

Having thus described my invention I claim:
1. A method of reducing the amount of finely divided particulate matter discharged in a sintering process of the type wherein a sinter mix comprising a shallow bed of fine particles comprising iron-bearing ores and fuel is agglomerated by igniting the mixture so as to produce porous coherent lumps followed by breaking the porous coherent lumps into useful sizes and then cooling the resulting particles by air, the improvement comprising spraying onto the sinter mix an aqueous solution of a water soluble lignosulfonate in a quantity sufficient to provide from 0.025 to 5 pounds of lignosulfonate per ton of sinter mix wherein particulate emissions from the forced air ignition of the fine particles and from the air cooling of the porous coherent lumps are substantially reduced.
2. The method of claim 1 where the lignosulfonate solutions contains a nonionic surfactant in an amount sufficient to increase the penetration of the material on the sinter mix.
3. The method of claim 1 wherein the lignosulfonate is in the form of a water soluble salt of a compound from the group consisting of sodium, potassium, calcium, and ammonium.

* * * * *